United States Patent
Burke

(10) Patent No.: US 7,262,811 B2
(45) Date of Patent: *Aug. 28, 2007

(54) SYSTEM AND METHOD FOR AUTOMATIC ZOOM

(75) Inventor: Lawrence A. Burke, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 315 days.

This patent is subject to a terminal disclaimer.

(21) Appl. No.: 11/025,164

(22) Filed: Dec. 29, 2004

(65) Prior Publication Data

US 2006/0139465 A1    Jun. 29, 2006

(51) Int. Cl.
*H04N 5/44* (2006.01)
*H04N 9/74* (2006.01)

(52) U.S. Cl. .................. 348/561; 348/581; 348/913

(58) Field of Classification Search ............... 348/561, 348/562, 580–582, 704, 913, 443, 445, 441, 348/458, 459; 382/298–300; *H04N 5/44, H04N 9/74, 7/01*
See application file for complete search history.

(56) References Cited

U.S. PATENT DOCUMENTS

| 5,136,398 | A | * | 8/1992 | Rodriguez-Cavazos et al. | . 348/445 |
| 5,161,002 | A | * | 11/1992 | Rodriguez-Cavazos et al. | . 348/445 |
| 6,366,706 | B1 | * | 4/2002 | Weitbruch | .................. 348/445 |

* cited by examiner

*Primary Examiner*—Sherrie Hsia
(74) *Attorney, Agent, or Firm*—Benjamin D. Driscoll

(57) ABSTRACT

A system and method for automatically zooming "in" and "out" a video content stream to adjust for Ratio Mismatches is disclosed. The present invention is particularly applicable to 4:3 video content delivered in a 16:9 video content stream. The present invention scans for the presence of Pillar Bars. When Pillar Bars are detected by the present invention, after waiting a pre-determined period to confirm the presence and size of the Pillar Bars, the present invention initiates a slow stretching the video content stream to eliminate the Pillar Bars. When the video content stream changes back to without Pillar Bars, the present invention initiates a slow zooming out to a full pixel representation of the video content stream.

20 Claims, 4 Drawing Sheets

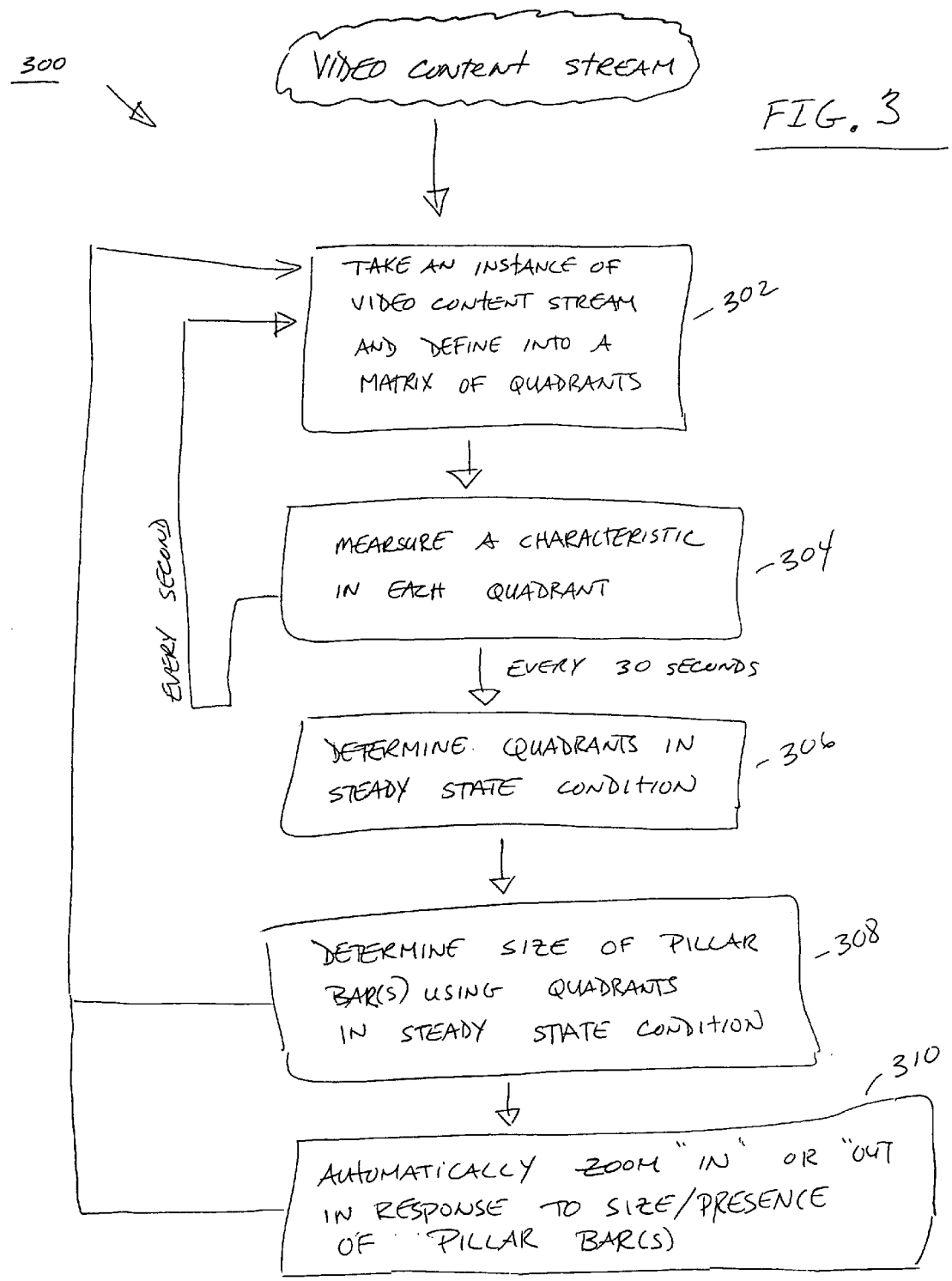

FIG. 4(a)
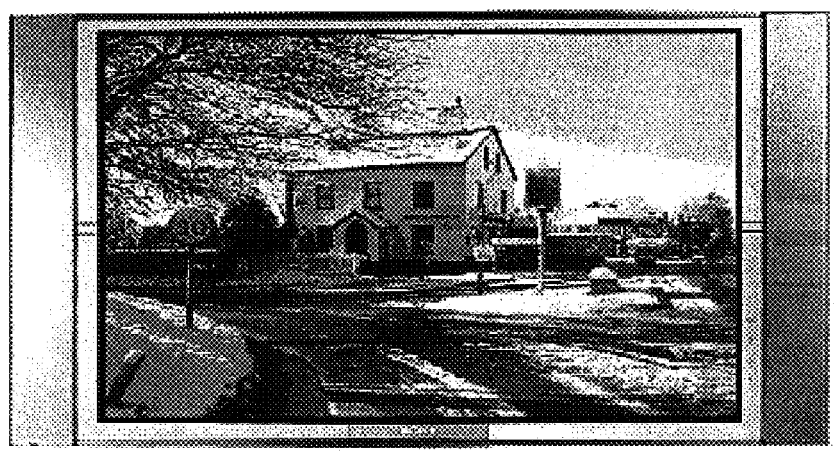
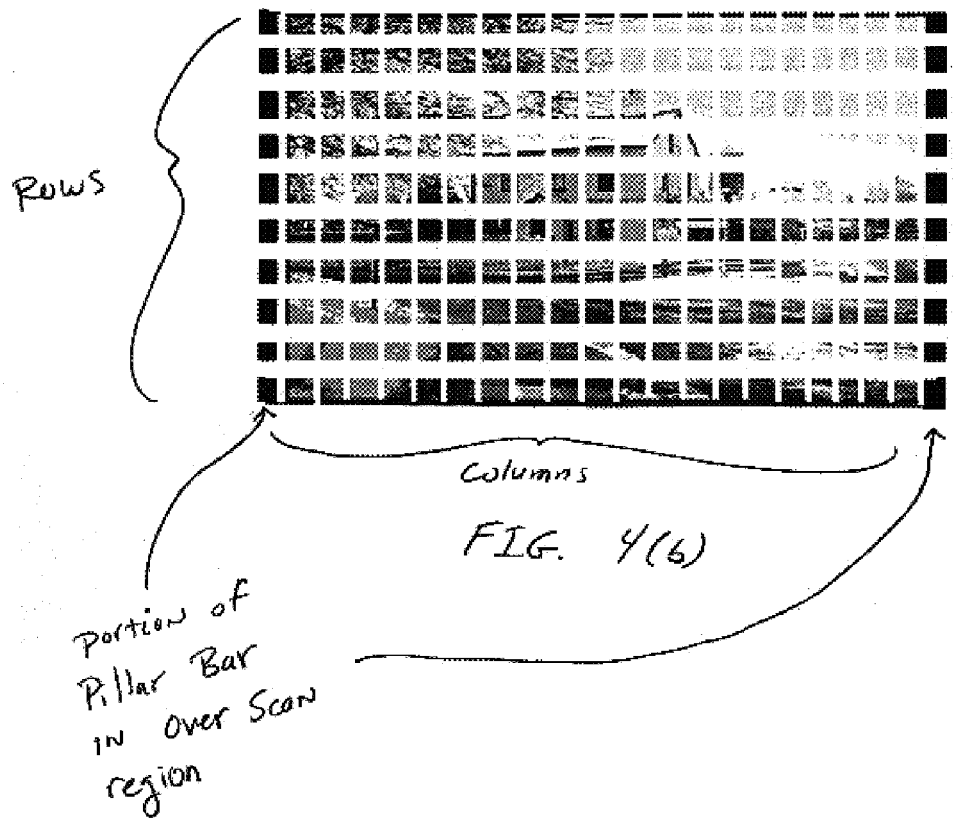
Rows
Columns
FIG. 4(b)
Portion of Pillar Bar in Over Scan region

SYSTEM AND METHOD FOR AUTOMATIC ZOOM

FIELD OF THE INVENTION

The present invention relates to digital video signals. More specifically, the present invention relates to digital video content ratios in a digital video stream.

BACKGROUND OF THE INVENTION

Today broadcast video content is available in both a 4:3 ratio and 16:9 ratio formats. Typically, standard definition ("SD") broadcast video is sent in 4:3 and high definition ("HD") broadcast video is sent in 16:9. However, sometimes television broadcasters send HD video signals containing programs that were originally filmed in the 4:3 format ("Ratio Mismatch"). In this instance, the HD broadcaster must add vertical bars ("Pillar Bars") to the left and right sides of the picture to fill the entire 16:9 HD display area. These Pillar Bars are typically black in color, but also may be gray, or some other color or graphic.

In the case of a Ratio Mismatch where 16:9 content is sent in a 4:3 video stream, horizontal Pillar Bars are added to the top and bottom of the picture to fill the entire 4:3 display area. Horizontal Pillar Bars are also commonly referred to as "Letter box Bars". As used herein the term "Pillar Bars" is used with reference to both vertical (left and right) bars and horizontal (top and bottom) bars.

To compensate for the above-described Ratio Mismatch, 16:9 HD televisions/displays and set top boxes typically have a manual "Zoom" function. The Zoom function is usually implemented via a button on an associated remote control to (i) stretch the image horizontally to remove the Pillar Bars thereby compromising the aspect ratio, or (ii) stretch the image both horizontally and vertically thereby filling the display and preserving aspect ratio, while sacrificing a portion of the top and bottom of the image. (The Zoom feature can also prevent uneven display degradation on plasma monitors.) This manual Zoom process is totally controlled by the end user and can be imprecise, inconsistent, and time consuming because the end user is required to press a button(s) on the remote control and step/cycle through Zoom states. Further, when the video content changes ratio (the Pillar Bars disappear or change size, for example), the end user will again have to re-adjust the Zoom, either "in" or "out" manually. In addition, if the video content changes ratio when the end user is performing their manual Zoom, the end user will become highly frustrated, as the end user attempts to zoom to compensate for a ratio which has since passed. An end user's only other option is to select a static zoom setting, which may under or over Zoom depending on the Ratio Mismatched video content size.

Thus, what is needed is a system and method which provides a more consistent and efficient process for zooming "in" and "out" a video content stream to adjust for Ratio Mismatches.

SUMMARY OF INVENTION

An object of the present invention is to provide for automatic zooming "in" and "out" of a video content stream to adjust for Ratio Mismatches.

In order to achieve this objective, as well as others which will become apparent in the disclosure below, the present invention provides for an automatic zoom system and method for automatically zooming "in" and "out" a video content stream to adjust for Ratio Mismatches. The present invention is particularly applicable to 4:3 video content delivered in a 16:9 video content stream, which is often found in HD video content streams.

In an exemplary embodiment of the present invention, the end user selects the desired Auto-Zoom setting on their television, video display, or video set top box at the time of initial setup. Such setting would preferably be a one dimensional, horizontal or vertical zoom only (for vertical and horizontal Pillar Bars, respectively); or a two dimensional zoom, intended to preserve aspect ratio. The present invention then scans for the presence of Pillar Bars. When pillar bars are detected by the present invention, after waiting a pre-determined period to confirm the presence and size of the Pillar Bars, the present invention slowly initiates a stretching of the video content stream to eliminate the Pillar Bars in accordance with the Auto-Zoom setting (above).

When the video content stream changes back to without Pillar Bars, the present invention initiates a slow zooming out to a full pixel representation of the video content stream. Further, the present invention constantly determines the presence of Pillar Bars, so that as the video content stream alternates between a full 16:9 presentation and a Ratio Mismatch, the present invention automatically zooms the video content stream "in" and "out" as needed.

Thus, the present system and method provides for automatically zooming "in" and "out" a video content stream to adjust for Ratio Mismatches.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein:

FIG. 3 is an illustration of the basic process flow of the method for automatically zooming "in" and "out" a video content stream to adjust for Ratio Mismatches in accordance with an exemplary embodiment of the present invention;

FIG. 4(a) is an illustration of the view able area of 4:3 content transmitted in a 16:9 video bit stream in a display after automatic zoom in accordance with an exemplary embodiment of the present invention for use with FIG. 4(b); and FIG. 4(b) is an illustration of the over-scan regions of 4:3 content transmitted in a 16:9 video bit stream after automatic zoom in accordance with another exemplary embodiment of the present invention.

DESCRIPTION OF A PRESENTLY PREFERRED EMBODIMENT

Figure 1A:
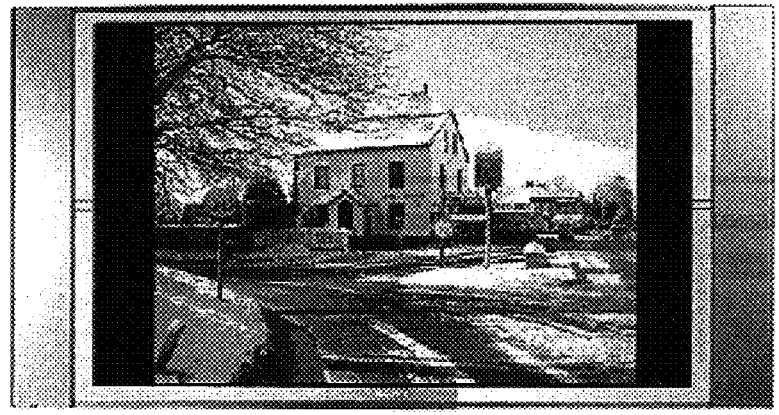
FIG. 1(a) is an illustration of 4:3 content transmitted in a 16:9 video bit stream.

FIG. 1(a) is an illustration of an instance of a 16:9 video stream where the broadcaster has sent 4:3 video content and has used left and right Pillar Bars to fill the remainder of the pixel space ("Ratio Mismatch"). This type of transmission is most typically used when a HD broadcaster is transmitting 4:3 video content in their 16:9 video content stream.

The present invention provides for a system and method for automatically zooming "in" and "out" a video content stream to adjust for Ratio Mismatches.

Figure 1B:
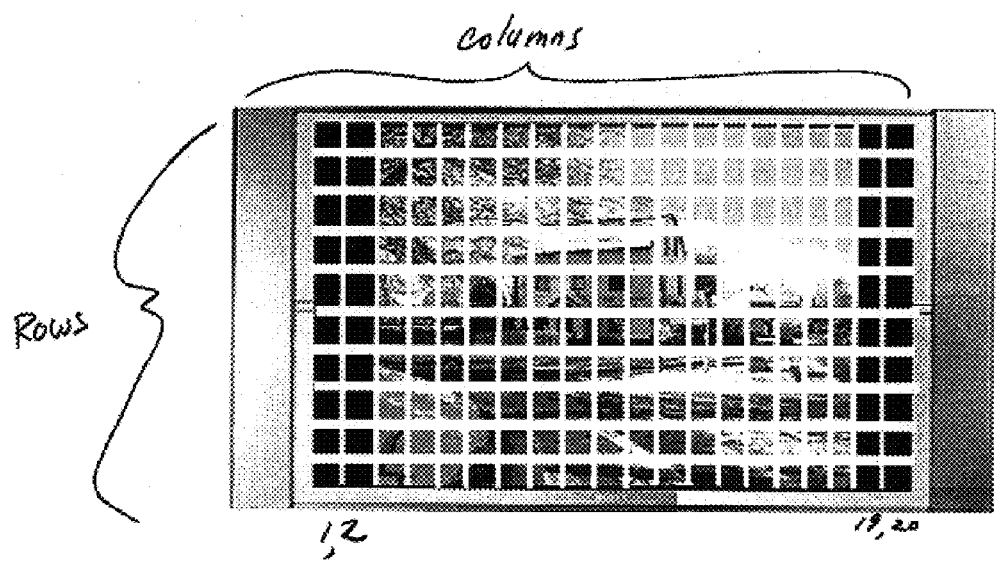
FIG. 1(b) is an illustration of 4:3 content transmitted in a 16:9 video bit stream with a matrix overlay in accordance with an exemplary embodiment of the present invention.

Referring to FIG. 1.(b) and FIG. 3, the system and method of the present invention begin by (a) defining an instance of a video content stream into a matrix of quadrants, in a matrix component, in step 302, as can be seen in the exemplary instance in of FIG. 1.(b). A 10×20 matrix is used in FIG. 1(b) simply as an illustrative example. Preferably a 72×48 matrix is used. However, any matrix size, up to and including the full resolution of the video source, can be used.

Next, the present invention (b) measures a characteristic in each quadrant of the matrix of that instance, in a measuring component, in step 304. Such characteristic may include luminance and/or chrominance, for example. Preferably luminance of the pixels in each quadrant is the characteristic measured in step (b) 304 because by using luminance, the present invention can analyse Pillar Bars of any color or pattern, e.g., black, gray, graphics, etc.

The present invention then repeats steps (a) 302 and (b) 304 for a number of iterations, to (c) determine which quadrants have the characteristic in a steady state condition, in a determining component, in step 306. In this exemplary embodiment, steps (a) 302 and (b) 304 are repeated for 30 cycles with a one (1) second interval between each cycle. However, there are numerous variants for the number of cycles and interval therebetween, which can be determined by one of ordinary skill in the art.

After quadrants which are in a steady state are determined, in step (d) 306, the present invention uses that steady state quadrant determination to (d) determine the size of the Pillar Bars in the video content stream, in a size component, in step 308. In an exemplary embodiment, in step (d) 308, the present invention evaluates each row in the matrix for quadrants determined in step (c) 304 to be in a steady state condition. After analysing each row, the present invention derives the lowest number of quadrants in a steady state condition across all rows of the matrix (also can be described as "number of columns in the matrix with all quadrants in a steady state condition"). The resultant number equals the width of the Pillar Bars (left and right). Referring to FIG. 1(b), the lowest number of quadrants in a steady state condition across all rows of the matrix would be 4.

For efficiency purposes, the present invention may simply analysis half of each row to determine the width of one Pillar Bar. For example, if only the first half of each row is analysed for steady state quadrants, the width of the left Pillar Bar can be determined. In this case, the present invention assumes the right Pillar Bar is of comparable width and, thus, will still arrive at the width of the Pillar Bars.

Figure 2A:
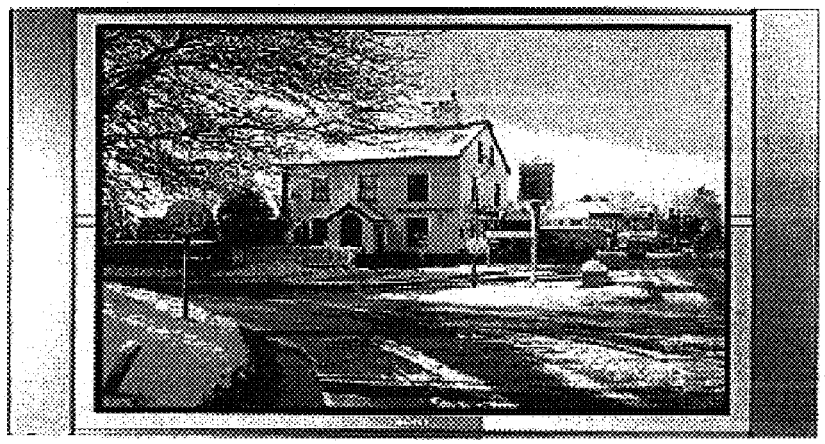
FIG. 2(a) is an illustration of 4:3 content transmitted in a 16:9 video bit stream after automatic zoom in accordance with an exemplary embodiment of the present invention.

After determining the resultant lowest number of quadrants in a steady state condition across all rows of the matrix, the present invention horizontally zooms in the video content stream to an amount equal to the size of the Pillar Bars, in an automatic zoom component, in step 310. The resultant "zooming in" can be seen in FIG. 2(a). The type of Auto-Zoom (one-dimensional or two dimensional) used can be end user defined as described above.

Figure 2B:
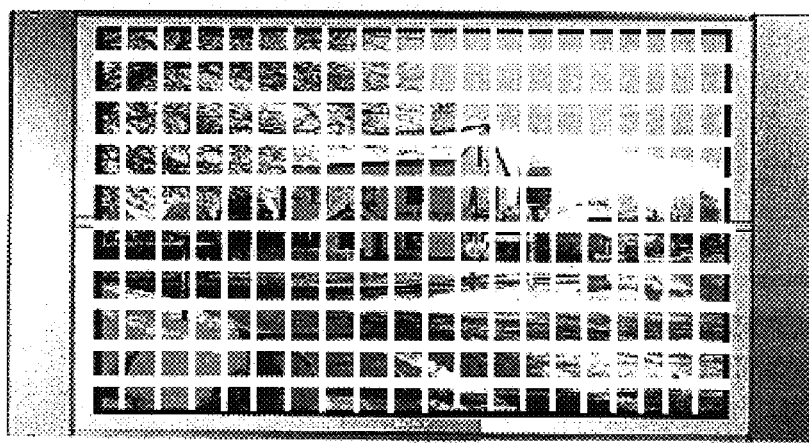
FIG. 2(b) is an illustration of the matrix overlay over 4:3 content transmitted in a 16:9 video bit stream after automatic zoom in accordance with an exemplary embodiment of the present invention.

After completing step (d) 308, the present invention return to step (a) 302 and begins the process again. Preferably, the time interval between the completion of step (d) 306 and returning to step (a) 302 to begin the inventive method again is one (1) second. In this way, the present invention repeatedly monitors the size/presence of Pillar Bars. This allows the present invention to detect the elimination of previously determined Pillar Bar (as described below), as well detection of new wider Pillar Bars (where the lowest number of quadrants in a steady state condition across all rows of the matrix is higher than the previous state) so the present invention can automatically zoom "in" more. FIG. 2(b) illustrates the recursive process described above as a matrix is still overlayed over an instance of the video content stream for repeated quadrant steady state condition analysis.

To account for a change in the video content back to a full 16:9 video stream, the present invention provides monitoring to determine quadrants in the above determined Pillar Bars are no longer in a steady state condition. Preferably, if at least one quadrant in the above determined Pillar Bars are no longer in a steady state condition, the present invention determines that the Pillar Bars (or at least the same Pillar Bar(s)) do not exist. In that case, the present invention zooms the video content stream out to a full pixel representation.

In accordance with another exemplary embodiment for zooming out, in the case that a television, set-top box, or other display device will not allow for quadrant steady state condition analysis of quadrants out of its display area due to the inventive zoom "in" (described above, where the Pillar Bars are completely eliminated) ("Truncated Display"), the present invention provides for an alternative automatic zooming "in" where the video content stream is zoomed "in" to an amount equal to the size of the Pillar Bars minus a small portion of the Pillar Bars. The small portion of the Pillar Bars are preferably approximately equal to the over-scan region in most display devices, as to keep this small portion of the Pillar Bars outside of the view of the end user but still in the display. FIGS. 4(a) and 4(b) illustrate this inventive technique and the small portion of Pillar Bars in the over-scan region.

Using this small area of the Pillar Bars in the over-scan region, a display device which cannot analyse quadrants which have been cropped due to the zoom, can use the small Pillar Bars portion to determine if at least one steady state quadrant in this small region is no longer in a steady state condition. In that case, the present invention assumes that the full 16:9 video content has returned to the video content stream and zooms the video content stream "out" to a full pixel representation. Thereafter, analysis beginning with step (a) 302 begins again.

Using the same inventive system and method described above, top and bottom Pillar Bars can be determined and eliminated by zooming "in". In this instance, step (d) would comprise determining the lowest number of quadrants in a steady state condition across all columns of the matrix (also can be described as "number of rows in the matrix with all quadrants in a steady state condition"). This is useful when presenting 16:9 content in a 4:3 video stream, such as playing a 16:9 DVD movie on your DVD player which is outputting a 4:3 video content stream. Further, the inventive technique for Truncated Displays may also be employed when the present invention performs an automatic zoom "in" to remove a top and bottom Pillar Bars.

The present invention may also comprise an initial step, before step (a) 302 of determining the current zoom state ("zoomed out" to full pixel representation, "zoomed in" at particular number of quadrants, etc.) to form a base zoom state for the initial zooming and subsequent zooming "in" and "out" by a zooming state component.

Thus, the present system and method provides for automatically zooming "in" and "out" a video content stream to adjust for Ratio Mismatches.

Although the invention has been described herein by reference to an exemplary embodiment thereof, it will be understood that such embodiment is susceptible of modification and variation without departing from the inventive concepts disclosed. All such modifications and variations, therefore, are intended to be encompassed within the spirit and scope of the appended claims.

I claim:

1. A method for automatic zooming a video content stream, said method comprising:
    (a) defining an instance of a video content stream into a matrix of quadrants;
    (b) measuring a characteristic in each quadrant of said matrix of said instance; and
    (c) determining quadrants wherein said characteristic is in a steady state condition.

2. The method of claim 1 further comprising the step of returning to step (a) after completing step (b).

3. The method of claim 2 further comprising the step of returning to step (a) one second after completing step (b).

4. The method of claim 1 further comprising the step of (d) determining a size of at least one pillar bar in said video content stream based upon said quadrants in said steady state condition.

5. The method of claim 4, where in step (d) comprises determining a lowest number of said quadrants in said steady state condition across all rows of said matrix.

6. The method of claim 4, where in step (d) comprises determining a lowest number of said quadrants in said steady state condition across all columns of said matrix.

7. The method of claim 4 further comprising the step of horizontally zooming in said video content stream an amount equal to a size of at least one pillar bar.

8. The method of claim 7 farther comprising the step of vertically zooming in said video content stream in proportion to said horizontal zooming in to preserve an aspect ratio of said video content stream.

9. The method of claim 4 farther comprising the step of vertically zooming in said video content stream an amount equal to a size of at least one pillar bar.

10. The method of claim 9 further comprising the step of horizontally zooming in said video content stream in proportion to said vertical zooming in to preserve an aspect ratio of said video content stream.

11. The method of claim 4 further comprising the step of horizontally zooming in said video content stream an amount equal to a size of at least one pillar bar, minus an overscan region.

12. The method of claim 11 further comprising the step of vertically zooming in said video content stream in proportion to said horizontal zooming in to preserve an aspect ratio of said video content stream.

13. The method of claim 4 further comprising the step of vertically zooming in said video content stream an amount equal to a size of at least one pillar bar, minus an overscan region.

14. The method of claim 13 further comprising the step of horizontally zooming in said video content stream in proportion to said vertical zooming in to preserve an aspect ratio of said video content stream.

15. The method of claim 4 further comprising the step of repeating step (a) followed by step (b) 30 times before proceeding to step (c).

16. The method of claim 4 further comprising the step of returning to step (a) after completing step (d).

17. The method of claim 16 further comprising the step of returning to step (a) one second after completing step (d).

18. The method of claim 4 further comprising the step of zooming out to a full pixel representation of said video content stream if a pre-determined number of quadrants in said at least one pillar bar are no longer in said steady state condition.

19. The method of claim 18 wherein said pre-determined number is at least 1.

20. The method of claim 1, wherein said characteristic comprises at least one of luminance and chrominance.

* * * * *